United States Patent
Ullman et al.

(10) Patent No.: US 11,842,184 B2
(45) Date of Patent: Dec. 12, 2023

(54) VEHICLE SOFTWARE DEPLOYMENT SYSTEM

(71) Applicant: GM Cruise Holdings LLC, San Francisco, CA (US)

(72) Inventors: Nadav Ullman, San Francisco, CA (US); Thomas Bachant, San Francisco, CA (US); Paul Garcia, San Francisco, CA (US); Jake McCloskey, San Francisco, CA (US); Joseph Thibeault, San Francisco, CA (US); Jose Arturo Covarrubias Reynoso, South San Francisco, CA (US); Armin Mahmoudi, Los Gatos, CA (US); John Logan Anderson, San Francisco, CA (US); Liam O'Shea Staskawicz, Berkeley, CA (US); Vineel Chand Adusumilli, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/051,213

(22) Filed: Oct. 31, 2022

(65) Prior Publication Data

US 2023/0081919 A1  Mar. 16, 2023

Related U.S. Application Data

(63) Continuation of application No. 16/725,039, filed on Dec. 23, 2019, now Pat. No. 11,494,173.

(51) Int. Cl.
*G06F 9/445* (2018.01)
*G06F 8/65* (2018.01)
(Continued)

(52) U.S. Cl.
CPC ............... *G06F 8/65* (2013.01); *B60K 37/00* (2013.01); *G06F 8/658* (2018.02); *G06F 11/0739* (2013.01); *G06F 11/1433* (2013.01); *G07C 5/008* (2013.01); *G07C 5/0841* (2013.01); *H04L 67/34* (2013.01); *H04L 67/52* (2022.05); *B60K 2370/152* (2019.05); *B60K 2370/16* (2019.05);
(Continued)

(58) Field of Classification Search
CPC ........ G06F 8/65; G06F 8/658; G06F 11/0739; G06F 11/1433; G06F 2201/865; H04L 67/52; H04L 67/34; B60K 37/00; B60K 2370/589; B60K 2370/152; B60K 2370/16; G07C 5/008; G07C 5/0841
USPC .................................................. 717/168–178
See application file for complete search history.

(56) References Cited

U.S. PATENT DOCUMENTS

| | | | |
|---|---|---|---|
| 2009/0119657 A1* | 5/2009 | Link, II | G06F 8/64 717/171 |
| 2018/0376357 A1* | 12/2018 | Tavares Coutinho | H04W 64/003 |
| 2019/0102164 A1* | 4/2019 | Gur | G06F 8/658 |

* cited by examiner

*Primary Examiner* — Chuck O Kendall
(74) *Attorney, Agent, or Firm* — Akona IP PC

(57) ABSTRACT

There is disclosed herein examples of systems and procedures for performing software updates for vehicles. The vehicles may be scheduled for the software updates based on information related to the vehicles. Update systems may determine when the vehicles have entered service ranges of the update systems for the scheduled software updates and may initiate the software updates in response to determining that the vehicles have entered the service ranges. Progress of the software updates may be monitored and displayed on a dashboard system overseeing the software updates of the vehicles.

20 Claims, 8 Drawing Sheets

(51) Int. Cl.
  *G06F 11/14*   (2006.01)
  *H04L 67/00*   (2022.01)
  *G06F 8/658*   (2018.01)
  *B60K 37/00*   (2006.01)
  *G06F 11/07*   (2006.01)
  *G07C 5/00*    (2006.01)
  *G07C 5/08*    (2006.01)
  *H04L 67/52*   (2022.01)

(52) U.S. Cl.
  CPC .. *B60K 2370/589* (2019.05); *G06F 2201/865* (2013.01)

VEHICLE SOFTWARE DEPLOYMENT SYSTEM

PRIORITY DATA

This a Continuation claiming priority to and/or receives benefit from U.S. Non-Provisional application Ser. No. 16/725,039 (the '039 application), filed on Dec. 23, 2019, having the same title. The '039 application is hereby incorporated by reference in its entirety.

TECHNICAL FIELD

The present disclosure relates generally to vehicles and, more specifically, to systems and methods to provide automatic software updates of autonomous vehicles.

BACKGROUND

As more vehicle systems have come to depend on computers, software has become a large part of the operation of the vehicles. In particular, autonomous vehicles rely on software for route planning, maneuver planning, and motion planning among other operations. At times, the software may be updated for various reasons. In legacy embodiments, updating the software involved a technician physically connecting a device to the computer of the vehicle, where the device would cause the software of the vehicle to be updated.

BRIEF DESCRIPTION OF THE DRAWINGS

The following figures are provided with accompanying description to provide some examples for the understanding of the subject matter disclosed herein. A component may be labeled with a same reference numeral throughout the drawings to indicate that the component is the same component or includes the same features with other components labeled with the same reference numeral throughout the drawings where the same reference numeral is utilized.

DETAILED DESCRIPTION

Figure 1:
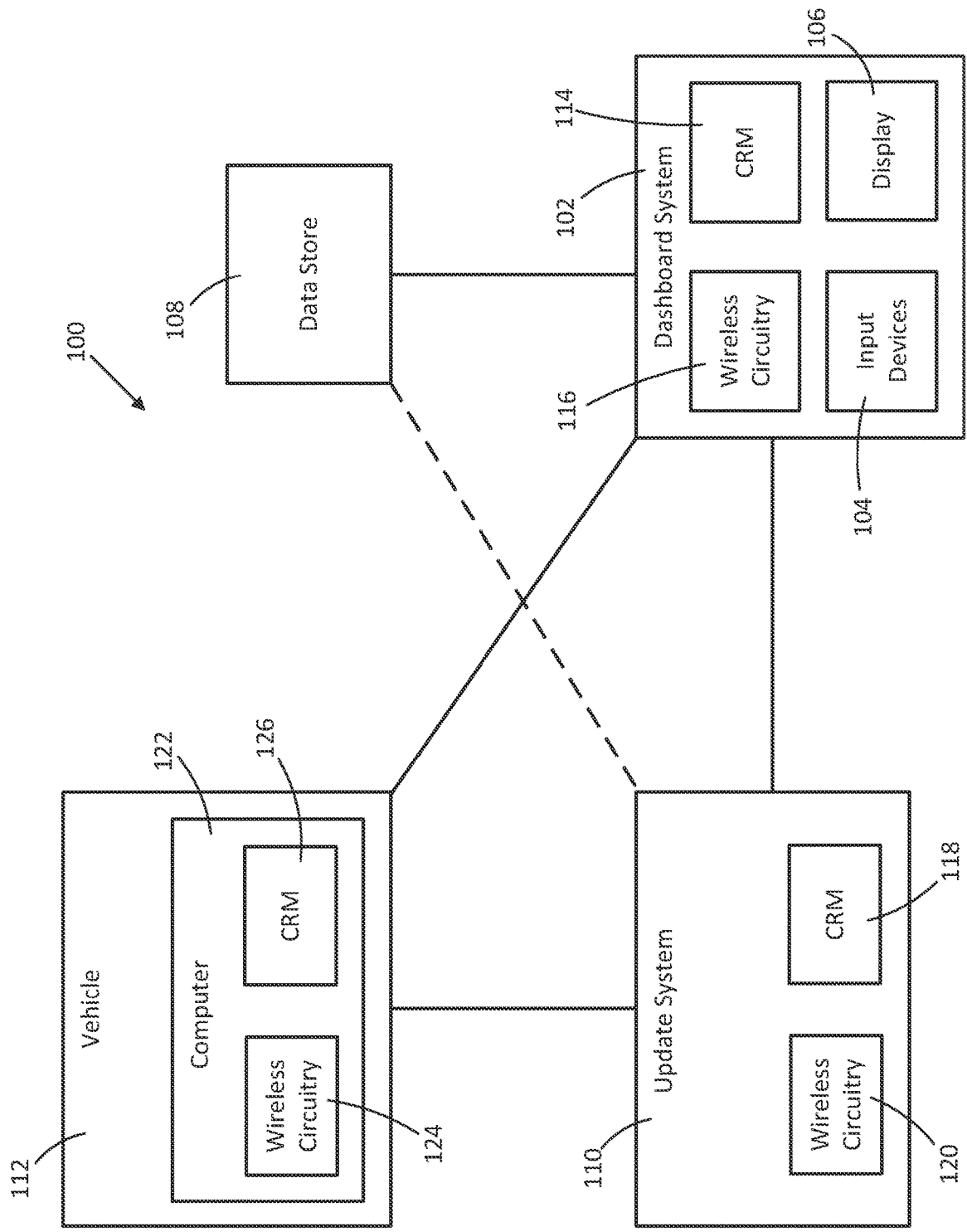
FIG. 1 illustrates an example software update system arrangement, according to embodiments described herein.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The following description and accompanying drawings provide some examples illustrating features of the subject matter described herein. The present disclosure relates generally to vehicles and, more specifically, to systems and methods to provide automatic software updates of autonomous vehicles.

Software has become an integral part of many vehicles. Software is utilized for control and implementation of many operations in vehicles. For example, autonomous vehicles can rely on software identifying surroundings of the autonomous vehicles and over time software may be developed to be implemented in the vehicles for various reasons, such as for improvement of operation of the vehicles. Software updates may be performed for the vehicles to update the software utilized by the vehicles.

Systems and procedures described herein may facilitate deployment of software updates for vehicles. Information related to the vehicles may be utilized for determining times for software updates for the vehicles and locations for software updates for the vehicles. It may be determined when the vehicles enter a service range of update systems at the locations and initiate the software updates in response to the vehicles entering the service range. Information related to the software updates may be provided to a dashboard system for monitoring of the software updates across the update systems.

As will be appreciated by one skilled in the art, features described herein may be embodied in various manners—e.g. as a method, a device, a system, a computer program product, a computer-readable medium, and/or other manners. Accordingly, features described herein may take the form of entirely hardware embodiments, entirely software embodiments (such as being implemented as one of more of firmware, resident software, micro-code, or other software implementations) or embodiments combining software and hardware aspects. Features of the subject matter described in the present disclosure may take the form of a computer program product. For example, the features may be implemented as instructions (such as program code) stored on one or more computer-readable medium(s) (such as non-transitory, computer-readable medium(s)) or one or more computer-readable medium(s) having instructions stored thereon, where the instructions, in response to execution by a device (such as a computer), cause the device to perform one or more operations. In various embodiments, the instructions may be stored on the computer-readable medium(s) during manufacturing of the computer-readable medium(s), or may be stored on the computer-readable medium(s) after manufacture of the computer-readable medium(s), including when the computer-readable medium(s) have been implemented within a device.

As utilized throughout this disclosure, the term "operational assignment" may refer to service operations to which the vehicles may be assigned to perform. For example, some examples of operational assignments to which the vehicles may be assigned include commuter ride-share and item delivery, where the vehicle will operate as a commuter ride-share vehicle or an item delivery vehicle based on the operational assignment. As utilized throughout this disclosure, the term "shift" may refer to the time that a vehicle is on the road (i.e., not being charged, updated, and/or serviced) during the operational assignment. For example, the shift for a vehicle operating as a commuter ride-share vehicle may refer to the time that the vehicle is available to be requested for commuter ride-share service and the time that the vehicle is providing a commuter ride-share service for a commuter.

FIG. 1 illustrates an example software update system arrangement 100, according to embodiments described herein. In particular, the software update system arrangement 100 shows an arrangement of an example system and vehicle for updating software of the vehicle according to some embodiments.

The software update system arrangement 100 may include a dashboard system 102. The dashboard system 102 may comprise a computer system that can manage operations of one or more vehicles. The dashboard system 102 may include wireless circuitry 116 that allows the dashboard system 102 to communicate wirelessly with other components of the software update system arrangement 100. For example, the wireless circuitry 116 may allow the dashboard system 102 to communicate with the one or more vehicles wirelessly, such as via a mobile network. The dashboard system 102 may retrieve information from the vehicles and provide communications to the vehicles.

The dashboard system 102 may include one or more input devices 104 (such as a keyboard, a mouse, a touchscreen, microphone, or other input device for a computer) and a display 106 (such as a computer screen, a touch screen, or other display device for a computer) that can allow a user to interact with the dashboard system 102. The dashboard system 102 may utilize the display 106 to display information related to the update of the software of one or more vehicles to a user, such as the displaying the progress of software updates being performed, status of the software updates being performed, locations of the vehicles where the software updates are being performed, vehicles on which the software updates are to be performed, scheduling information for the software updates of the vehicles, or some combination thereof. The dashboard system 102 may further display information related to the vehicles on the display 106, such as configurations of components of the vehicles, information regarding operational assignments of the vehicles (such as scheduled charge-times, locations of the vehicles, the operational assignments to which the vehicles are assigned, or other information regarding the operational assignments), information regarding the states of the vehicles (such as the prior version of the software being utilized by the vehicle), or some combination thereof. In some embodiments, the dashboard system 102 may display to a user confirmations of when software updates have been initiated, estimated time and/or progress of software updates, indications whether the version of the software for the software updates is still building in a data store and providing a queue after the version of the software for the software updates is built, error messages, reasons for bottlenecks in the software update process, phase of software deployments (i.e., whether the software is a binary or a map), progress of updating vehicles for a software update (ex., a percentage of the vehicles for which the software update has been completed), recommended route of escalation based on an error or issue (i.e., how to address the error or issue to avoid the error or issue in software updates), or some combination thereof.

A user may interact with the dashboard system 102 via the input devices 104 to retrieve data and/or facilitate scheduling of the software updates of the vehicles. For example, the user may request that the dashboard system 102 display certain information regarding a software update. In some instances, the user may indicate times and/or locations for the vehicles to have the software update. For example, the user may indicate that a vehicle should proceed to an update system for the software update either at the current time or at some time in the future. Based on the user indication, indications may be transmitted to the vehicle and the corresponding update system by the dashboard system 102 indicating the time and/or location for the software update.

The dashboard system 102 may manage software updates of vehicles within the software update system arrangement 100. For example, the dashboard system 102 may identify software updates to be implemented in one or more of the vehicles. Further, the dashboard system 102 may determine the vehicles to which the software updates are to be performed based on the component systems being updated by the software update, the component arrangements of the vehicles, the prior software version implemented by the vehicles, or some combination thereof. The dashboard system 102 may facilitate scheduling of software updates of the vehicles based on the software update and/or information regarding the vehicles, such as the information regarding the operational assignments of the vehicles. Based on the version of the software for the software update, update systems, and/or the vehicles, the dashboard system 102 may estimate the amount of time that a software update may take and may consider the amount of time when scheduling the software updates for the vehicles.

The dashboard system 102 may further include one or more computer-readable media 114. In some embodiments, the computer-readable media 114 may comprise non-transitory computer-readable media. The computer-readable media 114 may have instructions stored thereon that, when the instructions are executed by the dashboard system 102, cause the dashboard system 102 to perform one or more of the operations described throughout this disclosure.

The software update system arrangement 100 may further include a data store 108 coupled to the dashboard system 102. The data store 108 may comprise one or more data storage elements, such as memory devices, servers, or some combination thereof. The data store 108 may store version of the software to be utilized for updating the software of the vehicles. In some embodiments, the version of the software for the updating the software of the vehicles may comprise binaries and/or maps. The data store 108 may further store information related to the vehicles, such as the configuration of components of the vehicles, information regarding the operational assignments for the vehicles, or some combination thereof. The dashboard system 102 may retrieve data from the data store 108 and utilize the data for scheduling and performance of software updates of the vehicles.

The software update system arrangement 100 may further include one or more update systems. In the illustrated embodiment, an update system 110 is illustrated and described for brevity, although it should be understood that the one or more update systems may include one or more features of the update system 110. The update system 110 may comprise a computer system with wireless communication capability that can establish wireless connections within a proximity of the update system 110 and provide software updates via the wireless connections. In some embodiments, the proximity where the update system 110 establishes the wireless connections may be limited to a building, or some portion thereof, where the update system 110 is housed. For example, the update system 110 may be housed within a facility, where the proximity includes the facility or some portion thereof. In other embodiments, the proximity where the update system 110 establishes the wireless connections may extend to the distance provided by the wireless communication circuitry of the update system 110.

Each of the update systems may be located at locations remote to the dashboard system 102 and may perform the software updates of the vehicles. The update system 110 may be coupled to the dashboard system 102 and may receive indications of the version of the software to be utilized for the update, the vehicles to be updated, and/or the scheduled times for the vehicles to be updated from the dashboard system 102. The indication corresponding to a vehicle may be provided by the dashboard system 102 to the update system 110, where each of the update systems may receive indications for the vehicles they are scheduled to update. In response to receiving the indication corresponding to a vehicle, the update system 110 may prepare to perform the software update of the vehicle. For example, the update system 110 may download the version of the software for the software update from the dashboard system 102 and/or the data store 108 and search for the vehicle entering a proximity of the update system 110 around the scheduled time for the software update to prepare for performance of the software update. In other instances, the update system 110 may download the version of the software for the software update after detecting that the vehicle entered the proximity of the update system 110 or may download portions of the version of the software for the software update while other portions of the version of the software for the software update may be utilized for updating the software of the vehicle.

The update system 110 may include wireless circuitry 120. The wireless circuitry 120 may allow the update system 110 to wirelessly communicate with one or more of the other components of the software update system arrangement 100. For example, the wireless circuitry 120 may allow the update system 110 to wirelessly communicate with one or more vehicles, where the update system 110 may utilize the wireless connection to update the software of the vehicles. The wireless circuitry 120 may provide a short-range wireless communication network, such as Wi-Fi, Bluetooth, and/or other wireless local area networks. The wireless circuitry 120 may provide for wireless connections to be established with the vehicles when the vehicles are located within the proximity of the update system 110.

The update system 110 may further include one or more computer-readable media 118. In some embodiments, the computer-readable media 118 may comprise non-transitory computer-readable media. The computer-readable media 118 may have instructions stored thereon that, when the instructions are executed by the update system 110, cause the update system 110 to perform one or more of the operations described throughout this disclosure.

The software update system arrangement 100 may further include one or more vehicles. In some embodiments, the vehicles may comprise one or more autonomous vehicles (such as the autonomous vehicle 700 (FIG. 7)). In the illustrated embodiment, a vehicle 112 is illustrated and described for brevity, although it should be understood that the one or more vehicles may include one or more features of the vehicle 112.

The vehicle 112 may include a computer 122. The computer 122 may control one or more operations of the vehicle 112. For example, the computer 122 may control the movement of the vehicle 112 in embodiments where the vehicle 112 is an autonomous vehicle. The computer 122 may have software stored thereon that facilitates the control of the one or more operations of the vehicle 112. The software of the computer 122 may be updated by the update system 110. The updates of the software may make changes to how the computer 122 controls the one or more operations of the vehicle 112.

The computer 122 may include wireless circuitry 124. The wireless circuitry 124 may allow the computer 122 to communicate with one or more of the other components of the software update system arrangement 100. For example, the wireless circuitry 124 may provide communication via a mobile network with the dashboard system 102. Further, the wireless circuitry 124 may provide for short-range wireless communication via a short-range wireless communication network (such as Wi-Fi, Bluetooth, and/or other wireless local area networks) with the update system 110.

The computer 122 may provide information regarding the status of the vehicle 112 to the dashboard system 102, such as a state-of-charge of the vehicle, the operational assignment of the vehicle, any current service (such as a current item deliver and/or a current ride-share ride) being performed by the vehicle, or some combination thereof, via the mobile network. Further, the computer 122 may receive instructions from the dashboard system 102, where the instructions can cause the computer 122 to perform operations with the vehicle 112. For example, the instructions from the dashboard system 102 may provide the computer 122 with instructions as to when and where a software update for the computer 122 is to be performed. The dashboard system 102 may determine the time and the location for the software update based on the information received from the computer 122, information retrieved from the data store 108, the software update to be performed, or some combination thereof. Based on the instructions received from the dashboard system 102, the computer 122 may cause the vehicle 112 to proceed to the location for the software update at the scheduled time of the software update. For example, the vehicle 112 may proceed to the location of the update system 110 at the scheduled time. In some embodiments, the computer 122 may cause an indication of the time and location for the software update to be displayed within the vehicle 112 in addition to or in lieu of the vehicle 112 proceeding to the location for the software update at the scheduled time.

The computer 122 may further emit one or more identifiers of the vehicle 112 via the wireless circuitry 124. For example, the identifiers may include one or more Wi-Fi signals and/or internet protocol (IP) addresses associated with the vehicle 112. The update system 110 may detect the identifiers when the vehicle 112 has entered within the proximity of the update system 110. In response to the update system 110 detecting that the vehicle 112 has entered the proximity of the update system 110, the update system 110 may initiate the software update of the vehicle 112. The update system 110 may receive the indication of the scheduled time for the update of the software from the dashboard system 102 and may monitor for the identifiers of the vehicle 112 within a period of time of the scheduled time for the update of the software.

The computer 122 may further include one or more computer-readable media 126. In some embodiments, the computer-readable media 126 may comprise non-transitory computer-readable media. The computer-readable media 126 may have instructions stored thereon that, when the instructions are executed by the computer 122, cause the computer 122 to perform one or more of the operations described throughout this disclosure.

Figure 2:
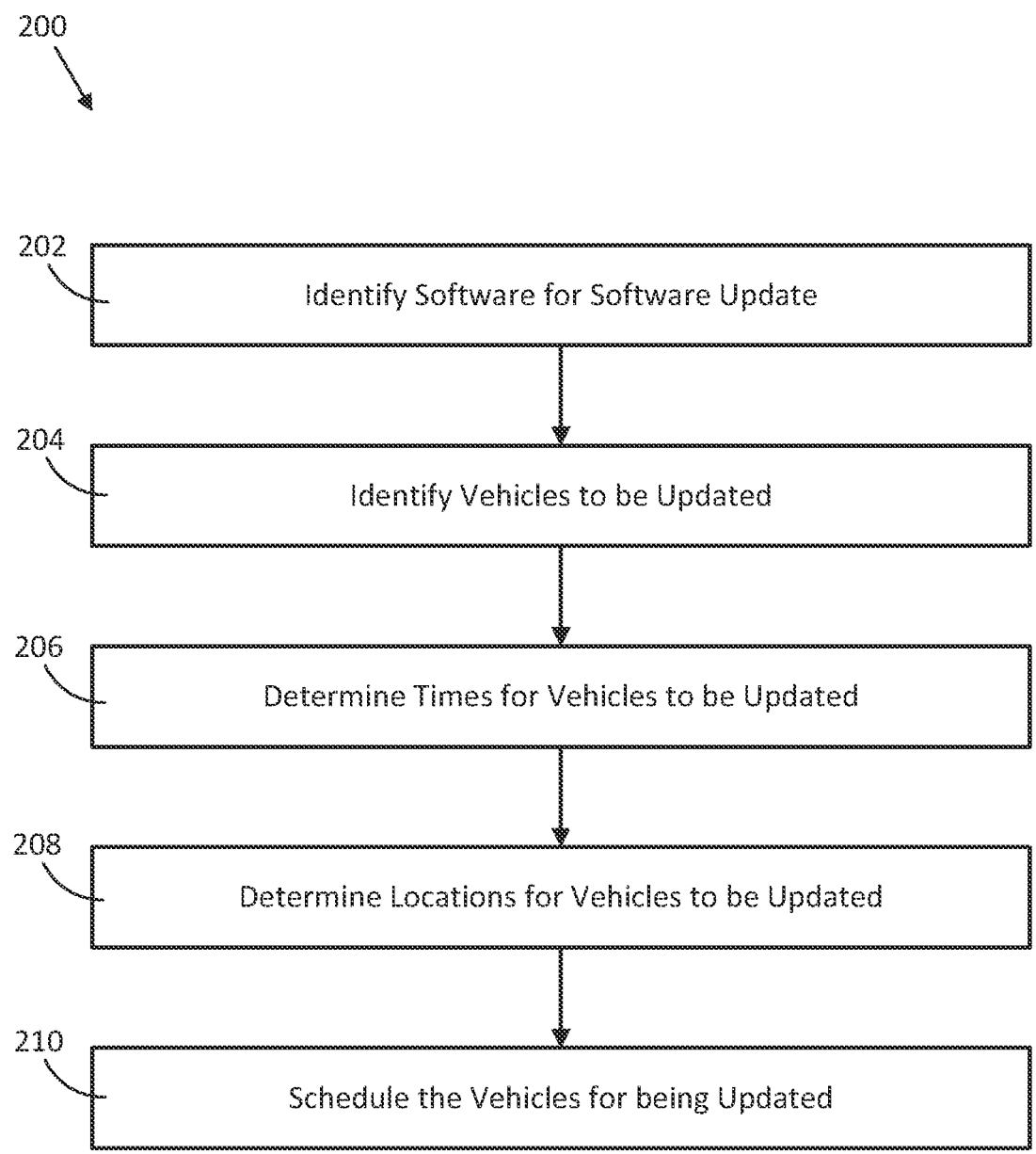
FIG. 2 illustrates an example procedure for scheduling software updates of a vehicle, according to embodiments described herein.

FIG. 2 illustrates an example procedure 200 for scheduling software updates of a vehicle, according to embodiments described herein. For example, the dashboard system 102 (FIG. 1) may perform the procedure 200 to schedule software updates of one or more vehicles (such as the vehicle 112 (FIG. 1)).

In stage 202, a version of software for an update may be identified. For example, a version of software for the update for one or more vehicles may be identified in a data store (such as the data store 108 (FIG. 1)). In some embodiments, a user may indicate the version of the software to be utilized for the update. The storage location of the version of the software may further be identified when identifying the version of the software. For example, a uniform resource locator (URL) indicating where the version of the software is stored on the data store may be identified.

In stage 204, one or more vehicles may be identified to receive the software update. In some instances, the version of the software may be applicable to all of the vehicles coupled to a dashboard system and/or all of the vehicles within a fleet of vehicles. In other instances, the version of the software may be applicable to specific components of the vehicle. For example, the version of the software may be applicable to a specific camera, where the specific camera may be included in some of the vehicles and may be omitted from other of the vehicles. In the instances that the version of the software is applicable to specific components of the vehicles, information regarding components of the vehicles (which may be retrieved from the data store 108 and/or received from the vehicles) may be utilized to determine which of the vehicles to which the software updates are applicable bases on which of the vehicles includes the specific component. The dashboard system may utilize information regarding the version of the software received from a user or retrieved from the data store to determine whether the version of the software is applicable to all of the vehicles, applicable to specific components, the components to which the version of the software is applicable, or some combination thereof.

Once the vehicles to which the software update is applicable are identified, the vehicles to be updated can be identified based on the version of the software of the vehicles. For example, the version of the software loaded on the vehicles to which the software update is applicable may be determined. The version of the software loaded on the vehicles may be determined based on information retrieved from the data store or received from the vehicles. If the version of software loaded on a vehicle is the version of the software to which the vehicle is to be updated or the version of the software on the vehicle does not require an update to the software, the vehicle is determined to not require an update to the software. If the version of the software loaded on a vehicles is to be updated to the version of the software for the software update, the vehicle may be identified to be updated.

In stage 206, times for updating the software of the vehicles identified to be updated may be determined. The times for updating the software may be determined based on an immediacy rating of the software, schedules of the vehicles, and/or current services being performed by the vehicles. For example, the times for updating the vehicles may be determined based on the charge of the vehicles, the shifts of the operational assignments of the vehicles, the distance from facilities housing update systems, location and/or time of last trips of the vehicles, the vehicle statuses of the vehicles, which of the vehicles have the lowest charges, which of the vehicles have shifts of the operational assignments ending soon, which of the vehicles has drivers of the vehicles indicating that the vehicle should be charged soon, or some combination thereof. The schedules of the vehicles and/or the current services being performed by the vehicles may be received from the vehicles and/or the data store. The software may be associated with a rating of the immediacy of the update. The rating of the immediacy for the software may be determined based on information for the software retrieved from the data store. In some embodiments, the immediacy ratings may include multiple different immediacy ratings, where each of the immediacy ratings can indicate when the update of the vehicle should be scheduled based on the schedule of the vehicle. For example, one of the immediacy ratings may indicate that the vehicle is to return to a location with an update system (such as the update system 110 (FIG. 1)) as soon as the vehicle is not performing a service (such as an item deliver and/or a ride-share ride). Another of the immediacy ratings may indicate that the vehicle should be scheduled for the software update when the vehicle is currently scheduled to be at a location with an update system for an amount of time that it should take to perform the software update to the version of the software. Based on the immediacy rating of the software, the schedules of the vehicles, and/or the current services being performed by the vehicles, the times that the vehicles should be scheduled for the software update.

In stage 208, locations for vehicles to be updated may be determined. Locations of facilities with an update system, schedules for the facilities, resources (such as number of spaces for parking of the vehicles during software update and/or wireless bandwidth for performing software updates) of the facilities may be retrieved from the data store and/or the update system and may be utilized for determining the locations for each of the vehicles to be updated. For example, a location that a vehicle may be located at the scheduled time may be determined based on the schedule of the vehicle and/or a service being performed by the vehicle. A location with an update system nearest to the location of the vehicle at the scheduled time may be identified as the location for the software update of the vehicle. The available resources (i.e., the available number of spaces for parking of the vehicles and/or the available wireless bandwidth) of the location with an update system nearest to the location at the determined time for the software update are analyzed to determine if there are adequate resources for updating the vehicles at the determined time. If there are adequate resources available at the location with the update system for the vehicle at the determined time, it may be determined as the location for the vehicle to be updated. If there are inadequate resources available at the location with the update system for the vehicle at the determined time, the next closest location with an update system may be checked for availability and/or a different time for the vehicle to be updated may be determined until a location with adequate resources at a determined time for the vehicle is identified, where the identified location may be determined as the location for the vehicle to be updated.

In stage 210, the vehicles may be scheduled for being updated. Scheduling of the vehicles may include providing indications to each of the vehicles of the determined times and locations for the software updates for each of the vehicles. The indications provided to the vehicles may cause the vehicles to display the scheduled time and the scheduled location of the software update and/or cause the vehicles to proceed to the scheduled location at the scheduled time. Scheduling of the vehicles may further include providing indications to the update systems of the vehicles scheduled for update at the locations of the update systems and the scheduled times that the vehicles are scheduled to arrive at the locations. The indications may further include an indication of the storage location where the version of the software for the software update is stored in some embodiments, where the version of the software may be retrieved by the update systems. For example, the indication of the storage location where the version of the software is stored may comprise a URL for accessing the version of the software. In some embodiments, the dashboard system may provide the version of the software for the software update to the update systems. The indications provided to the update systems may cause the update systems to monitor for the corresponding vehicles to enter within the proximities of the updates systems at the scheduled times, where the update systems may initiate the software updates for the vehicles in response to detecting the vehicles entering with the proximities of the update systems.

Figure 3:
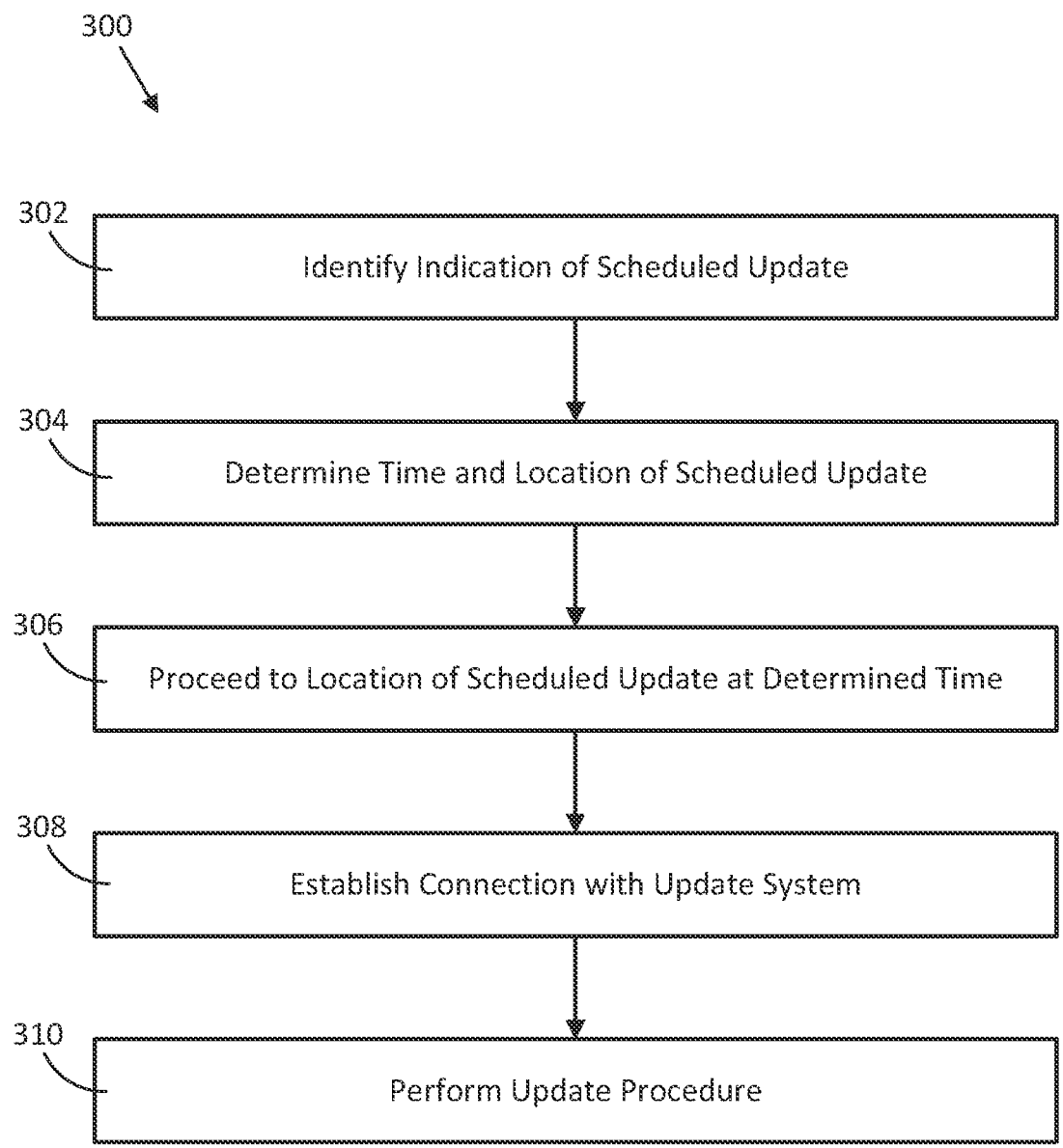
FIG. 3 illustrates an example procedure for a vehicle having software updated, according to embodiments described herein.

FIG. 3 illustrates an example procedure 300 for a vehicle having software updated, according to embodiments described herein. The procedure 300 may be performed by one or more vehicles, such as the vehicle 112 (FIG. 1).

In stage 302, an indication of a scheduled update may be identified. For example, the vehicle may identify an indication received from a dashboard system (such as the dashboard system 102 (FIG. 1)) that indicates a scheduled time and scheduled location for a software update to be completed. The indication may be received via a mobile network.

In stage 304, the time and location of the scheduled update may be determined. For example, the vehicle may determine the scheduled time and the scheduled location from the indication received from the dashboard system. The vehicle may display the scheduled time and/or the scheduled location in response to receiving the indication in some embodiments. The vehicle may continue with the operational assignment prior to the scheduled time.

In stage 306, the vehicle may proceed to the determined location of the scheduled update at the determined time. For example, the vehicle may proceed to the location determined in stage 304 at the time determined in stage 304. In some embodiments, a user of the vehicle may cause the vehicle to proceed to the determined location at the determined time.

In stage 308, a connection may be established with an update system at the determined location. The connection may be a wireless connection in some embodiments. The vehicle may emit an identification of the vehicle. For example, the vehicle may emit a Wi-Fi signal and/or an IP address that identifies the vehicle. The update system may identify the Wi-Fi signal and/or the IP address of the vehicle and may perform a handshake with the vehicle. The vehicle may complete the handshake with the update system to establish the connection with the update system.

In stage 310, the update procedure may be performed. For example, the update system, with which the vehicle established the connection, may cause the software of the vehicle to be updated. The vehicle may receive the version of the software for the software update from the update system and may update the software of the vehicle with the version of the software received from the update system.

The vehicle may further monitor the progress of the update in some embodiments and provide indications of the progress of the update to the update system. In some embodiments, the vehicle may also run test software while the software is being updated to verify that the software update is being completed properly. In response to detecting an error in the update of the software, the vehicle may provide an indication of the error to the update system. The indication of the error may include an indication that the error occurred, an indication of which error occurred, or some combination thereof. The indication of the error may cause an indication to be displayed on the update system and/or the dashboard system that the error occurred. The vehicle may utilize the version of the software of the software update after the update procedure has been completed. If an error occurs, the vehicle may utilize the prior version of the software that was on the vehicle prior to the software until the software update has a chance to complete successfully. Based on the information received from the vehicle, the update system and/or the dashboard system may identify bottlenecks and/or failures of the software update and/or a software update system arrangement (such as the software update system arrangement 100 (FIG. 1)) in some embodiments.

Figure 4:
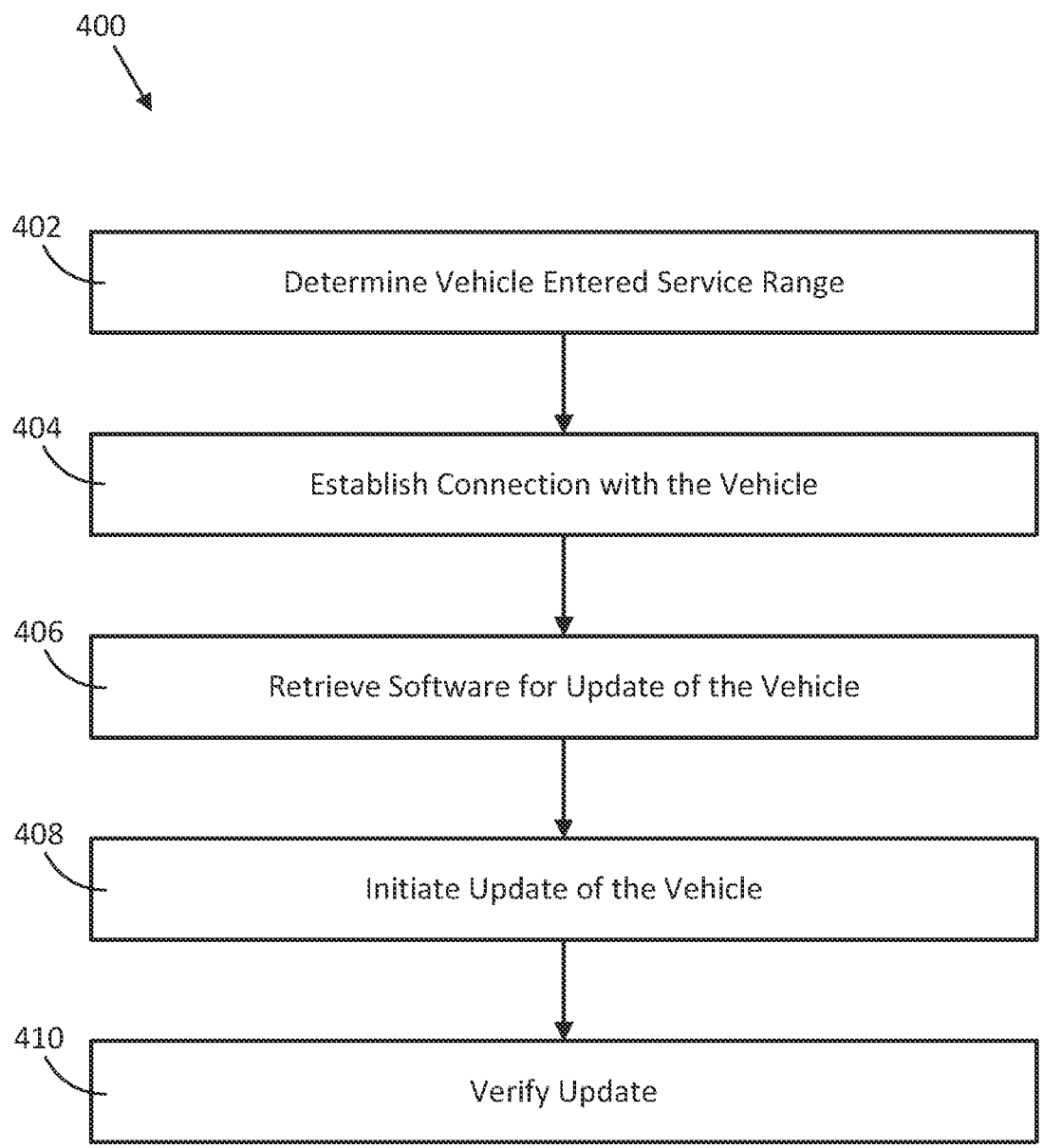
FIG. 4 illustrates an example procedure for a updating a vehicle by an update system, according to embodiments described herein.

FIG. 4 illustrates an example procedure 400 for a updating a vehicle by an update system, according to embodiments described herein. For example, an update system (such the update system 110 (FIG. 1)) may perform the procedure to update software of a vehicle (such as the vehicle 112 (FIG. 1)).

In stage 402, the update system may determine that the vehicle to be updated has entered a service range of the update system. In particular, the update system may determine that the vehicle has entered a proximity of the update system, where the proximity may define the service range where the software update of the vehicle can be performed. In some embodiments, the proximity may be defined to include a facility, or some portion thereof, that houses the update system. In other embodiments, the proximity may be defined by a range of the short-range wireless communication network (such as Wi-Fi, Bluetooth, and/or other wireless local area networks) of which the update system is included. The update system may determine that the vehicle has entered the proximity based on the update system detecting a wirelessly-transmitted identifier of the vehicle. The wirelessly-transmitted identifier may comprise a Wi-Fi signal and/or an IP address associated with the vehicle. In some embodiments, the update system may monitor for entry of the vehicle within a period of time of the scheduled time for the software update of the vehicle.

Figure 5:
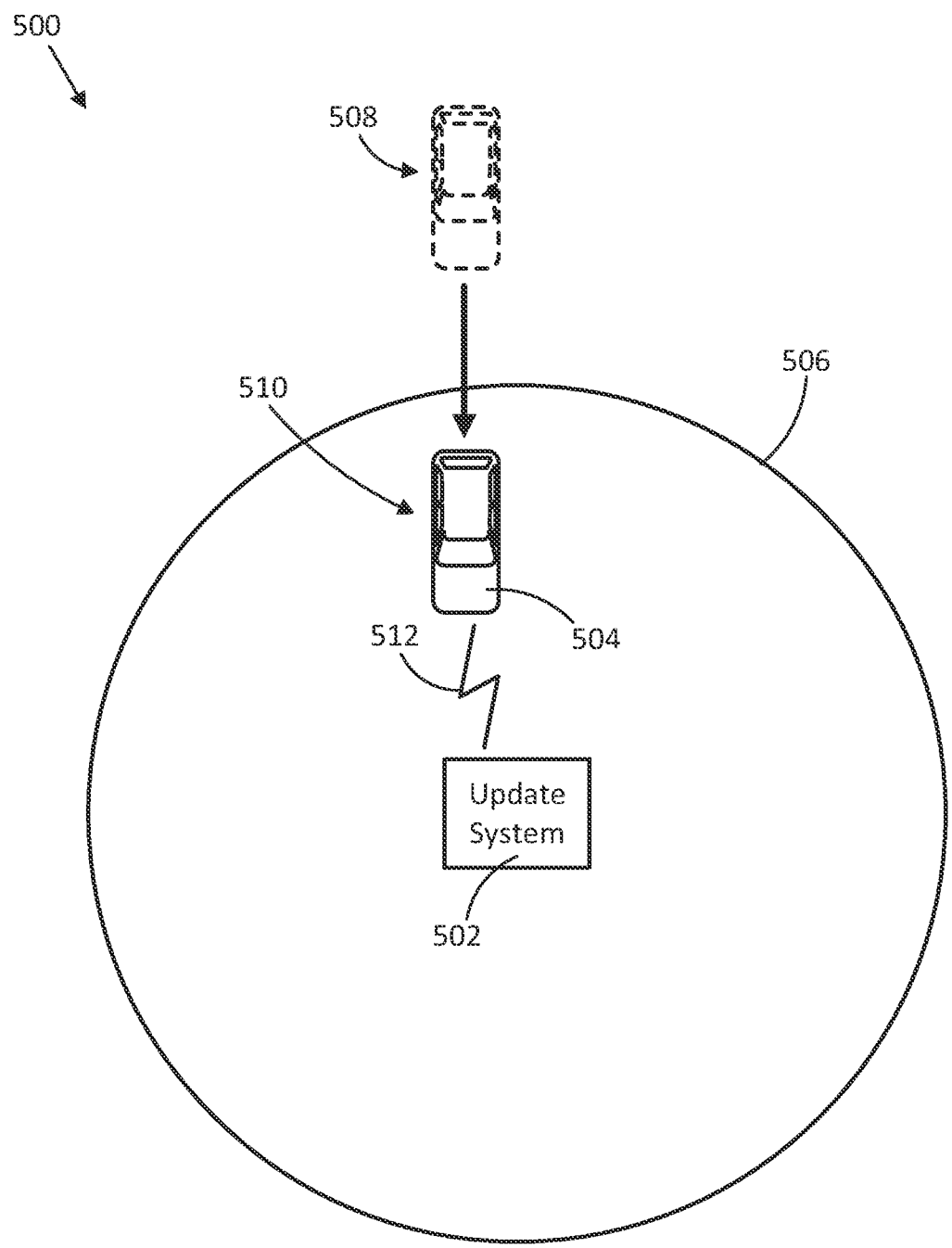
FIG. 5 illustrates an example arrangement for an update system detecting entry of a vehicle within a proximity of the update system, according to embodiments described herein.

FIG. 5 illustrates an example arrangement 500 for an update system 502 detecting entry of a vehicle 504 within a proximity 506 of the update system, according to embodiments described herein. For example, the update system 502 may detect that the vehicle 504 has entered the proximity 506 during stage 402 (FIG. 4).

In the illustrated embodiment, the vehicle 504 may start in a first position 508. The first position 508 may be located outside of the proximity 506 of the update system 502. The vehicle 504 may proceed to a second position 510 within the proximity 506 of the update system 502. For example, the vehicle 504 may proceed to the second position 510 at a scheduled time for a software update of the vehicle 504 based on an indication received from a dashboard system (such as the dashboard system 102 (FIG. 1)) indicating the scheduled time and scheduled location for the software update. The update system 502 may detect when the vehicle 504 has entered the proximity 506 of the update system 502 based on detecting an identifier of the vehicle 504 being emitted by the vehicle 504. The identifier may comprise a Wi-Fi signal and/or an IP address associated with the vehicle 504.

In stage 404, the update system may establish a connection with the vehicle. The connection may comprise a wireless connection. For example, the connection may comprise a short-range wireless connection, such as a Wi-Fi connection, a Bluetooth connection, and/or other wireless local area network connections. The update system may initiate a handshake with the vehicle in response to determining that the vehicle has entered the service range in stage 402. The update system and the vehicle may complete the handshake to establish a connection, such as the connection 512.

In stage 406, the update system may retrieve the version of the software for updating the vehicle. In particular, stage 406 may be performed if the version of the software has not been previously retrieved and stored by the update system. If the version of the software has been previously retrieved and stored by the update system, stage 406 may be omitted. The update system may retrieve the version of the software from the dashboard system or a data store (such as the data store 108 (FIG. 1)). The indication of the scheduled time and scheduled location for the software update may further include a storage location where the version of the software for the software update is stored. For example, the indication may include a URL corresponding to the storage location where the version of the software is stored, where the version of the software can be accessed via the URL. The update system may identify the location where the version of the software is stored from the indication and retrieve the version of the software from the location.

In stage 408, the software update of the vehicle may be initiated. For example, the update system may upload the version of the software for the software update to the vehicle and cause the vehicle to initiate the software update. In some embodiments, the software update of the vehicle may be initiated in response to detecting the vehicle has entered the proximity of the update system in stage 402. In other embodiments, an indication that the vehicle has arrived within the proximity of the update system may be displayed on the update system and/or the dashboard system in response to determining that the vehicle has entered the proximity of the update system in stage 402. In these embodiments, a user of the update system and/or the dashboard system may indicate that the software update should be initiated, and the update of the vehicle by the update system may be initiated in response to the indication that the software update should be initiated.

The update system may monitor the progress of the software update as it is being performed. If the update system detects that an error has occurred during the updating of the software, the update system may perform actions to address the error. In some embodiments, the actions to the address the error may include troubleshooting of the error and taking corrective actions based on the troubleshooting, restarting the software update or some portion thereof, causing an indication of the error to be displayed on the update system, providing an indication to the dashboard system of the occurrence of the error, causing an indication of the error to be stored (such as on the data store 108), causing an indication of the type of error (ex., an error code) to be displayed on the update system, providing an indication of the type of error to the dashboard system, causing an indication of the type of error to be stored (such as on the data store 108), or some combination. Depending on the error, the software update may continue or may be halted until the error can be corrected. In some instances where the software update is halted, the vehicle may continue to utilize the prior version of the software on the vehicle prior to the software update for operation of the vehicle. The update system may further provide an indication of the error to the dashboard system and the dashboard system may schedule the vehicle to remain at the location of the update system until the update is completed. Once the software update has been completed, the procedure may proceed to stage 410.

In stage 410, the software update may be verified. For example, the update system may verify that the software was updated properly. The update system may implement a test procedure to verify that the software of the vehicle was updated properly. In some embodiments, the update system may indicate to a user (which may be a vehicle technician) of the update system to perform one or more inspections on one or more vehicles on which the software updates have been performed. For example, an indication of the inspections to be performed for a vehicle and requesting user interaction to verify that the inspections have been performed may be displayed on the update system for a first vehicle on which the software update is performed in some embodiments. In some embodiments, a user of the dashboard system may define quality gates for each software update, where the quality gates may define the inspections to be performed for the vehicles, the number of vehicles updated by each of the update systems for which the inspections are to be performed, and/or which vehicles for which the inspections are to be performed for each of the update systems. In some embodiments, the dashboard system may remotely run tests on the vehicles to verify that the software update was successful and/or may monitor the operation of the version of the software from the software update on the vehicle. The dashboard system may detect whether the version of the software from the software update is running properly or if an error has occurred. If the test procedure indicates that the an error has occurred with the version of the software, an indication of the error may be displayed on the update system, an indication of the error may be displayed on the dashboard system, an indication of the error may be stored (such as on the data store 108), an indication of the type of error (ex., an error code) may be displayed on the update system, an indication of the type of error may be displayed on the dashboard system, an indication of the type of error may be stored (such as being stored on the data store 108), or some combination. If the test procedure indicates that the version of the software is operating properly, the procedure 400 may be completed.

Figure 6:
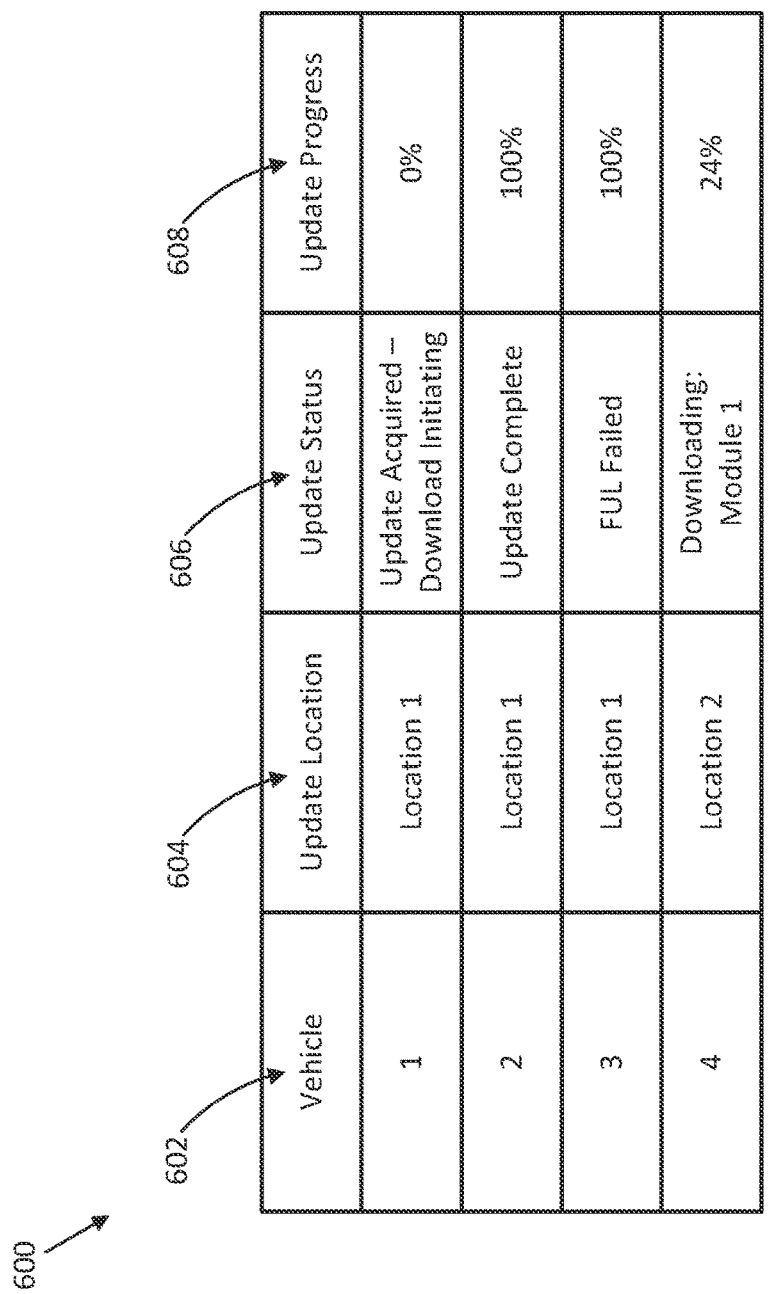
FIG. 6 illustrates an example user interface to indicate software update progress, according to embodiments described herein.

FIG. 6 illustrates an example user interface 600 to indicate software update progress, according to embodiments described herein. For example, the user interface 600 may be displayed on a dashboard system (such as the dashboard system 102 (FIG. 1)) and/or on an update system (such as the update system 110 (FIG. 1)). The user interface 600 may display information regarding software updates of vehicles according to the embodiments described herein.

The user interface 600 may include vehicle identifiers 602. The vehicle identifiers 602 may comprise a string of characters that identify vehicles for which software updates are to be performed. Each of the vehicle identifiers 602 may identify a specific vehicle. In the illustrated example, the vehicle identifiers 602 include numerals (i.e., 1, 2, 3, and 4) that identify specific vehicles for which a software update is being performed. It should be understood that while numerals are shown in the illustrated embodiment, the vehicle identifiers 602 may include any other indicator that can be utilized for identifying a vehicle and that can be displayed within a user interface. Further, while the user interface 600 shows information for vehicles for a single software update, it should be understood that the user interface 600 shows information for vehicles for multiple software updates in other embodiments, where the user interface 600 may further include an indication of the software update being performed each of the vehicles.

The user interface 600 may further include update location identifiers 604. The update location identifiers 604 may include a string of characters that identify locations where software updates can be performed for vehicles and/or update systems (such as the update system 110) that can perform software updates for vehicles. Each of the vehicles indicated by the vehicle identifiers 602 may have a corresponding update location identifier, where the corresponding update location identifier indicates where the vehicle is being updated or is to be updated. For example, the vehicle identified by the vehicle identifier '1' may have a corresponding update location identifier of 'Location 1' and the vehicle identified by the vehicle identifier '4' may have a corresponding update location identifier of 'Location 2' in the illustrated embodiment. Based on the update location identifiers 604, the location where the vehicles are to be updated can be determined.

The user interface 600 may further include update status indicators 606. The update status indicators 606 may include a string of characters that indicate the update status of vehicles. Each of the vehicles indicated by the vehicle identifiers 602 may have a corresponding update status indicator, where the update status indicators can indicate a statuses of software updates of the vehicles. The update status indicators 606 may indicate whether version of the software for the software update has been downloaded by an update system, whether a software update has been initiated, whether a software update has been completed, a process of the software update that is currently being performed for the vehicle, whether a software update has failed, and/or an indication of the failure of the software update (ex., an error code). For example, the vehicle identified by the vehicle identifier '1' may have a corresponding update status indicator of 'Update Acquired—Download Initiating' that indicates that the version of the software from the software update has been downloaded by the update system and that the software update is being initiated in the illustrated embodiment. Further, the vehicle identified by the vehicle identifier '4' may have a corresponding status update indicator of 'Downloading: Module 1' that indicates that the processing of downloading Module 1 to the vehicle is being performed. Based on the update status indicators 606, it can be determined whether the software update has initiated, whether the software update is progressing, whether an error has occurred, whether the software update has completed, or some combination thereof.

The user interface 600 may further include update progress indicators 608. The update progress indicators 608 may include a string of characters that indicate progresses of the software updates of vehicles. Each of the vehicles indicated by the vehicle identifiers 602 may have a corresponding update progress indicator, where the update process indicator can indicate an amount of progress of software updates of the vehicles. For example, the vehicle identified by the vehicle identifier '1' may have a corresponding update progress indicator of '0%' and the vehicle identified by the vehicle identifier '4' may have a corresponding update progress indicator of '24%' in the illustrated embodiment. In the illustrated embodiment, the update progress indicators 608 comprise percentages indicating the update progress of the software updates, although it should be understood that any other indicators of update progress that may be displayed in a user interface may be included in other embodiments. Based on the update progress indicators 608, it can be determined the amount of progress made to updating the software of the vehicles.

It should be understood that the user interface 600 may include one or more of the vehicle identifiers 602, the update location identifiers 604, the update status indicators 606, or the update progress indicators 608 in other embodiments. Further, other elements may be included in the user interface 600 in addition to the vehicle identifiers 602, the update location identifiers 604, the update status indicators 606, and/or the update progress indicators 608.

Figure 7:
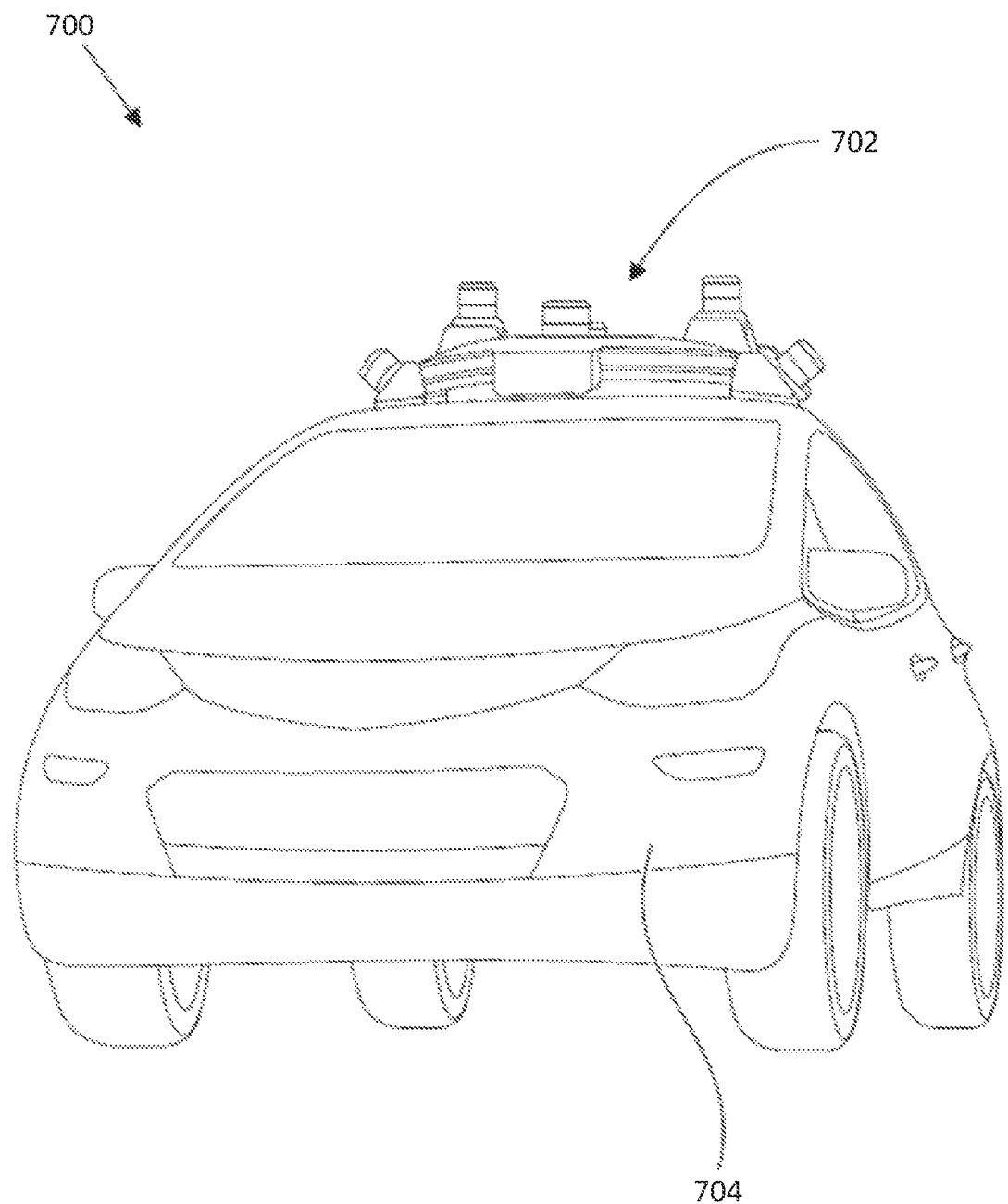
FIG. 7 illustrates an example autonomous vehicle, according to embodiments described herein.

FIG. 7 illustrates an example autonomous vehicle 700, according to embodiments described herein. The autonomous vehicle 700 is an example of an autonomous vehicle as described throughout this disclosure. In some embodiments, the vehicle 112 (FIG. 1) may comprise the autonomous vehicle 700. For example, the autonomous vehicle 700 may have software that may have the software updated via one or more of the systems (such as the dashboard system 102 (FIG. 1) and/or the update system 110 (FIG. 1)) and/or the procedures (such as the procedure 200 (FIG. 2), the procedure 300 (FIG. 3), and/or the procedure 400 (FIG. 4)) described throughout this disclosure.

The autonomous vehicle 700 may comprise a car 704. The autonomous vehicle 700 may include one or more sensors 702 mounted to the car 704. The sensors 702 may be mounted to various locations on the car 704. For example, the sensors 702 may be mounted to a roof of the car 704, side mirrors of the car 704, a front of the car 704, a back of the car 704, sides of the car 704, or some combination thereof.

The sensors 702 may include one or more cameras, one or more light detection and ranging (LIDAR) sensors, one or more radar sensors, or some combination thereof. In some embodiments, the radar sensors may include articulating radar sensors, long-range radar sensors, short-range radar sensors, or some combination thereof. The sensors 702 may detect the surroundings of the autonomous vehicle 700. For example, the sensors 702 may detect one or more objects surrounding the autonomous vehicle 700, such as other cars, pedestrians, trees, bicycles, objects within a road on which the autonomous vehicle 700 is travelling (such as construction and/or other objects that may impede movement of the vehicle), and/or indications surrounding the autonomous vehicle 700 (such as construction signs, stop indicators, and other street signs).

The autonomous vehicle 700 may further include a computer coupled to the sensors 702. The computer may receive data captured by the sensors 702 and utilize the data for localization, perception, prediction, route planning, maneuver planning, motion planning, path following, and low level controls of the autonomous vehicle 700. Further, the computer may be communicatively coupled to a server, a dashboard system (such as the dashboard system 102) and/or an update system (such as the update system 110) and may exchange communications with the server, the dashboard system, and/or the update system. The computer may further be coupled to one or more of the systems of the autonomous vehicle 700 and may control operation of throttle, braking, steering, and/or indicators of the autonomous vehicle 700.

Figure 8:
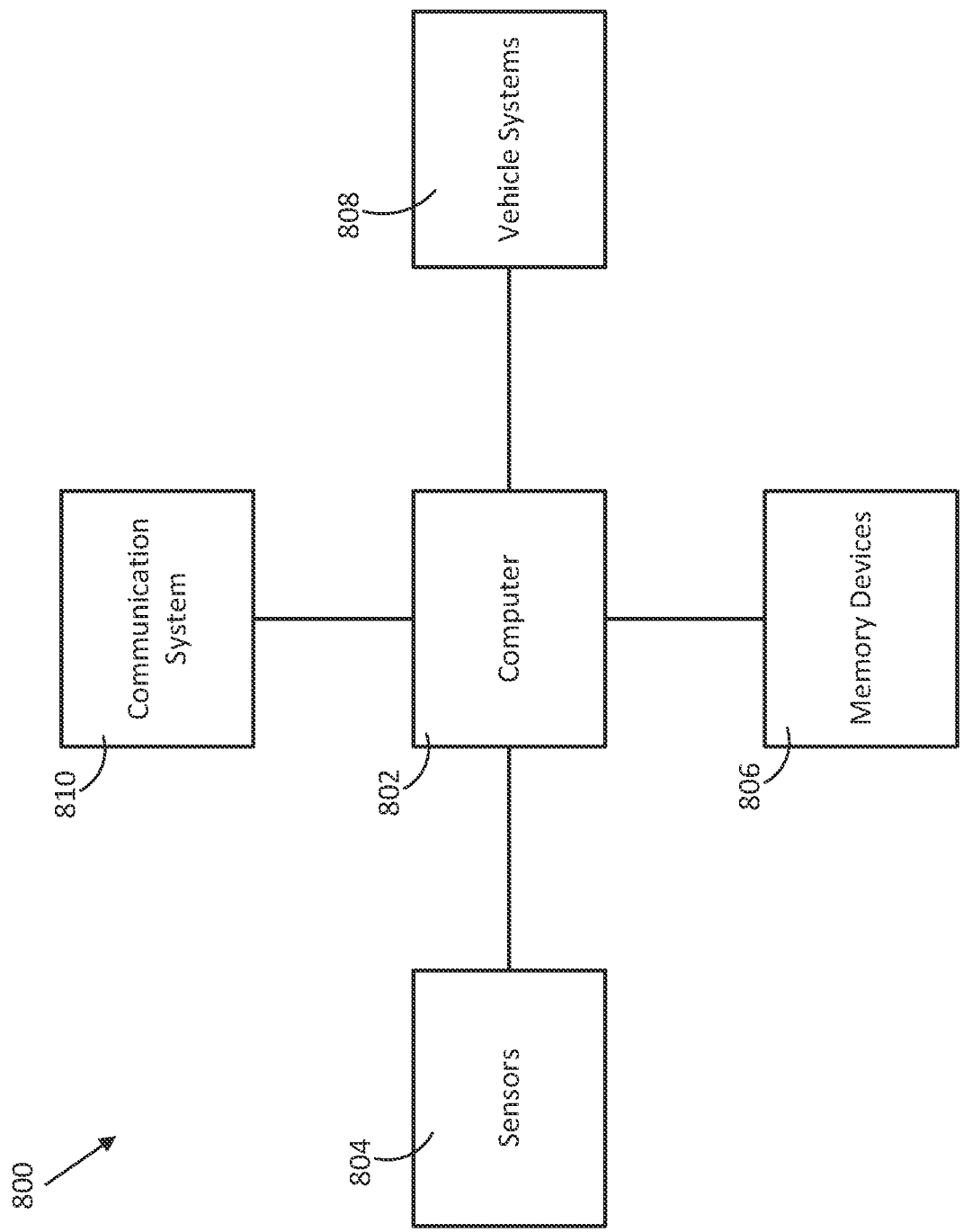
FIG. 8 illustrates example components that can be implemented within an autonomous vehicle, according to embodiments described herein.

FIG. 8 illustrates example components 800 that can be implemented within an autonomous vehicle, according to embodiments described herein. In particular, the components 800 may be implemented in the autonomous vehicles described throughout, such as the autonomous vehicle 700 (FIG. 7).

The components 800 may include a computer 802. The computer 802 may comprise and/or include one or more of the features of the computer 122 (FIG. 1). For example, the computer 802 may perform the procedure 300 for updating of software within the autonomous vehicle in which the computer 802 is implemented. The computer 802 may include one or more of the features of the computer described in relation to FIG. 7. The computer 802 may coordinate one or more operations of the autonomous vehicle and may analyze data captured by the autonomous vehicle. In some embodiments, the computer 802 may have software stored therein, wherein the software may be updated via one or more of the systems and/or procedures described throughout this disclosure.

The components 800 may further include one or more sensors 804. The sensors 804 may include one or more of the features of the sensors 702. The sensors 804 may be coupled to the computer 802 and may provide data captured by the sensors 804 to the computer 802.

The components 800 may further include one or more memory devices 806. The memory devices 806 may be coupled to the computer 802. In some embodiments, the memory devices 806 may also be coupled to the sensors 804. The memory devices 806 may be comprise computer-readable media. In some embodiments, the computer-readable media may be non-transitory computer-readable media. The memory devices 806 may store one or more instructions that, when executed by the computer 802, cause the computer 802 to perform one or more operations described throughout this disclosure being performed by a computer implemented in an autonomous vehicle. The instructions may comprise software, where the software may be updated via one or more of the systems and/or the procedures described throughout this disclosure. Further, the memory devices 806 may be utilized for storing data of the autonomous vehicle. For example, the computer 802 may provide the data received from the sensors 804 to the memory devices 806 for storage on the memory devices 806. Further, the memory devices 806 may store routes associated with route planning of the autonomous vehicle, maneuvers associated with maneuver planning of the autonomous vehicle, or some combination thereof.

The components 800 may further include one or more vehicle systems 808. The vehicle systems 808 may be coupled to the computer 802 and the computer 802 may control operation of the vehicle systems 808. The vehicles systems 808 may include motion systems of the autonomous vehicle, indicator systems of the autonomous vehicle, or some combination thereof. The motion systems may include a throttle system, a braking system, a steering system, or some combination thereof, of the autonomous vehicle.

The components 800 may further include a communication system 810. The communication system 810 may be coupled to the computer 802. The communication system 810 may comprise a wireless communication system and may allow the computer 802 to wirelessly communicate with other devices, such as update systems (such as the update system 110 (FIG. 1) and/or dashboard systems (such as the dashboard system 102 (FIG. 1)). The communication system 810 may implement one or more wireless communication standards, such as mobile communication standards, radar communication standards, satellite communication standards, global position system communication standards, Wi-Fi communication standards, and/or Bluetooth communication standards.

Select Examples

Below are provided some examples of embodiments in accordance with the subject matter provided in this disclosure. It should be understood that the examples are merely some examples and embodiments in accordance with the disclosed subject matter are not limited to the provided examples.

Example 1 may include one or more computer-readable media having instructions stored thereon, wherein the instructions, when executed by a dashboard system, cause the dashboard system to retrieve information related to a vehicle, determine, based on the information related to the vehicle, a time for a software update of software of the vehicle and a location for the software update of the software of the vehicle, generate an indication of the time for the software update and location for the software update, and provide the indication to the vehicle to schedule the software update.

Example 2 may include the one or more computer-readable media of example 1, wherein the instructions, when executed by the dashboard system, further cause the dashboard system to determine a component associated with the software update, determine that the vehicle includes the component, and determine that the software update is to be performed for the vehicle based on the determination that the vehicle includes the component.

Example 3 may include the one or more computer-readable media of example 1, wherein to determine the location for the software update includes to determine a location of the vehicle based on the information related to the vehicle, and identify the location for the software update from a plurality of locations for the software update based on the location for the software update being closest of the plurality of locations to the location of the vehicle.

Example 4 may include the one or more computer-readable media of example 1, wherein to determine the time for the software update includes to determine a time that the vehicle is scheduled to be at the location, and determine that the time for the software update to be the time that the vehicle is scheduled to be at the location.

Example 5 may include the one or more computer-readable media of example 1, wherein the instructions, when executed by the dashboard system, further cause the dashboard system to determine an immediacy rating associated with the software update, and wherein the time for a software update is determined based on the immediacy rating.

Example 6 may include the one or more computer-readable media of example 1, wherein the information related to the vehicle includes information related to an operational assignment of the vehicle.

Example 7 may include the one or more computer-readable media of example 1, wherein the instructions, when executed by the dashboard system, further cause the dashboard system to provide the indication to an update system at the location for the software update, and wherein the indication further includes an indication of a storage location for the software update.

Example 8 may include the one or more computer-readable media of example 1, wherein the information related to the vehicle includes a state-of-charge of the vehicle, a current service being performed by the vehicle, an operational assignment of the vehicle, or a current location of the vehicle.

Example 9 may include the one or more computer-readable media of example 1, wherein the vehicle is an autonomous vehicle, and wherein the indication of the time for the software update and the location for the software update is to cause the autonomous vehicle to proceed to the location for the software update at the time for the software update.

Example 10 may include a process for a software update of a vehicle, comprising determining, by a dashboard system, that the vehicle is to be scheduled for the software update based on information related to the vehicle, determining, by the dashboard system, a time for the software update and a location for the software update based on the information related to the vehicle, generating, by the dashboard system, an indication of the time for the software update and the location for the software update, and providing, by the dashboard system, the indication to the vehicle.

Example 11 may include the process of example 10, wherein determining that the vehicle is to be scheduled for the software update includes identifying, by the dashboard system, a version of software to which the vehicle is to be updated for the software update, identifying, by the dashboard system, a prior version of software being utilized by the vehicle, and determining, by the dashboard system, that the prior version of software is to be updated to the version of the software.

Example 12 may include the process of example 10, wherein determining that the vehicle is to be scheduled for the software update includes identifying, by the dashboard system, a component associated with the software update, and determining, by the dashboard system, that the vehicle includes the component based on the information related to the vehicle.

Example 13 may include the process of example 10, further comprising receiving, by the dashboard system, an indication of a progress of the software update for the vehicle, and displaying, by the dashboard system, the progress of the software update.

Example 14 may include the process of example 13, wherein the indication of the progress of the software update includes an indication that an error has occurred with the software update, and wherein displaying the progress of the software update includes displaying an indication of the error.

Example 15 may include the process of example 10, wherein determining the time for the software update and the location for the software update includes identifying, by the dashboard system, the location for the software update, and verifying, by the dashboard system, that the location for the software update has adequate resources for the software update at the time for the software update.

Example 16 may include the process of example 10, wherein determining the time for the software update and the location for the software update includes determining, by the dashboard system, a time that the vehicle is scheduled for service, wherein the time for the software update is determined to be the time that the vehicle is scheduled for the service, and determining, by the dashboard system, that the location for software update has adequate resources for the software update at the time that the vehicle is scheduled for the service, wherein the location for the software update is selected based on the location for the software update having adequate resources for the software update at the time that the vehicle is scheduled for the service.

Example 17 may include the process of example 10, further comprising providing, by the dashboard system, the indication to an update system to perform the software update, wherein the indication includes an indication of a storage location for the software update.

Example 18 may include one or more computer-readable media having instructions stored thereon, wherein the instructions, when executed by an update system, cause the update system to identify an indication of a scheduled software update of a vehicle, determine that the vehicle has entered a service range of the update system, and perform the scheduled software update of the vehicle in response to the determination that the vehicle has entered the service range.

Example 19 may include the one or more computer-readable media of example 18, wherein the indication of the scheduled software update includes an indication of a time for the scheduled software update, wherein the instructions, when executed by the update system, further cause the update system to identify the time for the scheduled software update from the indication of the scheduled software update, and where to determine that the vehicle has entered the service range of the update system includes to determine that the vehicle has entered the service range of the update system at the time for the scheduled software update.

Example 20 may include the one or more computer-readable media of example 18, wherein to perform the scheduled software update includes to establish a wireless connection with the vehicle in response to the determination that the vehicle has entered the service range, and utilize the wireless connection to update software of the vehicle.

Example 21 may include a process for performing a software update of vehicle, comprising determining, by an update system, that a vehicle has entered a service range of the update system for the software update, establishing, by the update system, a wireless connection with the vehicle in response to determining that the vehicle has entered the service range of the update system, and performing the software update of the vehicle via the wireless connection.

Example 22 may include the process of example 21, wherein determining the vehicle has entered the service range includes detecting a Wi-Fi signal or an internet protocol address associated with the vehicle.

Example 23 may include the process of example 21, further comprising retrieving, by the update system, a version of software for the software update, and utilizing, by the update system, the version of the software for the software update.

Example 24 may include one or more computer-readable media having instructions stored thereon, wherein the instructions, when executed by a vehicle, cause the vehicle to emit a Wi-Fi signal or an internet protocol address associated with the vehicle, the Wi-fi signal or the internet protocol address utilized for determination that the vehicle has entered a service range of an update system, establish a wireless connection with the update system, and perform a software update procedure via the wireless connection with the update system.

Example 25 may include the one or more computer-readable media of example 24, wherein the instructions, when executed by the vehicle, further cause the vehicle to identify an indication of scheduled software update for the vehicle, determine a time for the software update and a location for the software update, where the location for the software update is associated with the update system, and proceed to the location for the software update at the time for the software update.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In some embodiments, one or more of the components described throughout this disclosure may be implemented as one or more electrical circuits. The electrical circuits may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

Note that with the numerous examples provided herein, interaction may be described in terms of two, three, four, or more electrical components. However, this has been done for purposes of clarity and example only. It should be appreciated that the system can be consolidated in any suitable manner. Any of the disclosed components, modules, and element may be combined in various possible configurations in various embodiments, all of which are within the scope of this disclosure.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous changes, substitutions, variations, alterations, and modifications may be ascertained by one skilled in the art and it is to be understood that the present disclosure encompass all such changes, substitutions, variations, alterations, and modifications that may be ascertained by one skilled in the art. Further, it is to be understood that any protection that may be granted based on this disclosure are not to be limited by the description. Rather, the protection is to be defined by the appended claims when read in view of the description and as would be understood by one skilled in the art.

The invention claimed is:

1. A software update system arrangement, comprising:
  a dashboard system comprising:
    one or more first computer readable media having first instructions stored thereon that, when the first instructions are executed by the dashboard system, cause the dashboard system to:
      evaluate resources available at a facility;
      schedule a vehicle to receive a software update at the facility at a scheduled time based on a determination that the facility has adequate parking and wireless bandwidth at the scheduled time; and
      determine quality gates for the software update, wherein the quality gates define inspections to be performed for vehicles assigned to an update system, and which vehicles for which the inspections are to be performed, wherein the vehicle is one of the vehicles for which inspections are to be performed on the vehicle; and
  the update system housed in a facility, the update system comprising:
    short-range wireless circuitry,
    a user interface, and
    one or more second computer readable media having second instructions stored thereon that, when the second instructions are executed by the update system, cause the update system to:
      receive, from the dashboard system, an indication of a scheduled software update of a vehicle to be performed during a scheduled time at the facility;
      receive the quality gates for the software update from the dashboard system;
      receive identifiers emitted by vehicles via the short-range wireless circuitry;
      determine that the vehicle has entered the facility based on detecting an identifier of the vehicle in the received identifiers; and
      perform the scheduled software update of the vehicle in response to the determination that the vehicle has entered the facility using the short-range wireless circuitry;
      cause an indication of the inspections to be performed on the vehicle to be displayed via the user interface to a vehicle technician of the facility; and
      request, from the vehicle technician of the facility, user interaction via the user interface to verify that the inspections have been performed on the vehicle in the facility.

2. The software update system arrangement of claim 1, wherein determining that the vehicle has entered the facility includes:

monitoring for entry of the vehicle into the facility within a period of time of the scheduled time for the scheduled software update.

3. The software update system arrangement of claim 1, wherein determining that the vehicle has entered the facility includes:
  determining that the vehicle has entered the facility at the scheduled time for the scheduled software update.

4. The software update system arrangement of claim 1, wherein performing the scheduled software update includes:
  establishing a wireless connection via the short-range wireless circuitry with the vehicle in response to the determination that the vehicle has entered the facility; and
  utilizing the wireless connection to update software of the vehicle.

5. The software update system arrangement of claim 1, wherein the second instructions, when executed by the update system, further cause the update system to:
  initiate a handshake with the vehicle via the short-range wireless circuitry in response to determining that the vehicle has entered the facility.

6. The software update system arrangement of claim 1, wherein the second instructions, when executed by the update system, further cause the update system to:
  completing a handshake with the vehicle via the short-range wireless circuitry to establish a wireless connection.

7. The software update system arrangement of claim 1, wherein the second instructions, when executed by the update system, further cause the update system to:
  retrieve a version of software corresponding to the scheduled software update.

8. The software update system arrangement of claim 1, wherein the indication of the scheduled software update includes a storage location where a version of the software update corresponding to the scheduled software update is stored.

9. The software update system arrangement of claim 8, wherein the storage location is a uniform resource locator.

10. The software update system arrangement of claim 1, wherein performing the scheduled software update comprises:
  uploading a version of the software update corresponding to the scheduled software update to the vehicle using the short-range wireless circuitry; and
  causing the vehicle to initiate the scheduled software update.

11. The software update system arrangement of claim 1, wherein the second instructions, when executed by the dashboard system, further cause the dashboard system to:
  remotely cause a test procedure to be run on the vehicle to verify that the scheduled software update was successful.

12. The software update system arrangement of claim 1, wherein the second instructions, when executed by the update system, further cause the update system to:
  cause a display of the update system to display a user interface comprising vehicle identifiers, update status indicators, and update progress indicators.

13. One or more non-transitory computer-readable media having instructions stored thereon, wherein the instructions, when executed by an update system, cause the update system to:
  receive, from a dashboard system, an indication of a scheduled software update of a vehicle to be performed during a scheduled time at a facility that houses the update system, wherein the dashboard system determined that the facility has adequate parking spaces and wireless bandwidth to perform the scheduled software update during the scheduled time;
  receive, from the dashboard system, quality gates for the scheduled software update from the dashboard system, wherein the quality gates specify that the vehicle is to have inspections performed at the facility;
  receive, by the update system, identifiers emitted by vehicles via short-range wireless circuitry of the update system;
  determine, by the update system, that the vehicle has entered the facility based on detecting an identifier of the vehicle in the received identifiers;
  perform, by the update system, the scheduled software update of the vehicle in response to the determination that the vehicle has entered the facility using the short-range wireless circuitry;
  cause, by the update system, an indication of the inspections to be performed on the vehicle to be displayed via a user interface of the update system to a vehicle technician of the facility; and
  request, by the update system, from the vehicle technician of the facility, user interaction via the user interface to verify that the inspections have been performed on the vehicle in the facility.

14. A method, comprising:
  determining, by a dashboard system, that a vehicle is to receive a software update;
  evaluating, by the dashboard system, resources available at a facility that houses an update system;
  determining that the facility has adequate parking and wireless bandwidth at a scheduled time;
  scheduling, by the dashboard system, the vehicle to receive a scheduled software update at the facility at the scheduled time;
  determining, by the dashboard system, quality gates for the vehicle, wherein the quality gates define inspections to be performed for the vehicle at the facility;
  receiving, by the update system located within the facility, an indication of the scheduled software update of the vehicle;
  receiving, by the update system, identifiers emitted by the vehicle via short-range wireless circuitry of the update system;
  determining, by the update system, that the vehicle has entered the facility based on detecting an identifier of the vehicle in the received identifiers; and
  performing, by the update system, the scheduled software update of the vehicle in response to the determination that the vehicle has entered the facility using the short-range wireless circuitry;
  causing, by the update system, an indication of the inspections to be performed on the vehicle to be displayed via a user interface of the update system to a vehicle technician of the facility; and
  requesting, by the update system, from the vehicle technician of the facility, user interaction via the user interface to verify that the inspections have been performed on the vehicle in the facility.

15. The method of claim 14, wherein determining the vehicle has entered the facility includes:
  monitoring for entry of the vehicle into the facility within a period of time of the scheduled time for the scheduled software update.

16. The method of claim 14, wherein determining that the vehicle has entered the facility includes:

determining that the vehicle has entered the facility at the scheduled time for the scheduled software update.

17. The method of claim 14, wherein performing the scheduled software update includes:
   establishing a wireless connection via the short-range wireless circuitry with the vehicle in response to the determination that the vehicle has entered the facility; and
   utilizing the wireless connection to update software of the vehicle.

18. The method of claim 14, wherein performing the scheduled software update includes:
   uploading a version of the software update corresponding to the scheduled software update to the vehicle using the short-range wireless circuitry; and
   causing the vehicle to initiate the scheduled software update.

19. The method of claim 14, further comprising:
   remotely causing, by the dashboard system, a test procedure to be run on the vehicle to verify that the scheduled software update was successful.

20. The method of claim 14, further comprising:
   displaying, by a display of the update system, a user interface comprising vehicle identifiers, update status indicators, and update progress indicators.

* * * * *